United States Patent
Hsiung et al.

(10) Patent No.: US 11,968,293 B2
(45) Date of Patent: Apr. 23, 2024

(54) PRIVATE KEY MANAGEMENT

(71) Applicant: International Business Machines Corporation, Armonk, NY (US)

(72) Inventors: Wei-Hsiang Hsiung, Taipei (TW); Chun-Shuo Lin, Tainan (TW); Wei-Jie Liau, Taoyuan (TW); Cheng-Ta Lee, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 380 days.

(21) Appl. No.: 16/950,993

(22) Filed: Nov. 18, 2020

(65) Prior Publication Data

US 2022/0158824 A1    May 19, 2022

(51) Int. Cl.
*H04L 9/08* (2006.01)
*H04L 9/14* (2006.01)
*H04L 9/40* (2022.01)

(52) U.S. Cl.
CPC ............... *H04L 9/083* (2013.01); *H04L 9/14* (2013.01); *H04L 63/0281* (2013.01); *H04L 63/166* (2013.01)

(58) Field of Classification Search
CPC ....... H04L 9/083; H04L 9/14; H04L 63/0281; H04L 63/166; H04L 9/0838; H04L 9/3247; H04L 63/06
See application file for complete search history.

(56) References Cited

U.S. PATENT DOCUMENTS

| | | | | |
|---|---|---|---|---|
| 5,657,390 | A | * | 8/1997 | Elgamal .................... H04L 9/40 713/151 |
| 6,148,404 | A | * | 11/2000 | Yatsukawa ............ H04L 9/0869 726/2 |
| 8,644,516 | B1 | | 2/2014 | Le Saint et al. |
| 9,432,346 | B2 | | 8/2016 | Madden |
| 2002/0078344 | A1 | * | 6/2002 | Sandhu ................. H04L 9/3236 713/155 |

(Continued)

FOREIGN PATENT DOCUMENTS

| CN | 109302369 A | 2/2019 |
|---|---|---|
| CN | 110247803 A | 9/2019 |

(Continued)

OTHER PUBLICATIONS

"Trust establishment between Client and Server through External Key Management Server," IP.Com, An IP.com Prior Art Database Technical Disclosure, IP.com No. IPCOM000257238D, IP.com Electronic Publication Date: Jan. 24, 2019, 5 pages, https://priorart.ip.com/IPCOM/000257238.

(Continued)

*Primary Examiner* — John B King
(74) *Attorney, Agent, or Firm* — Peter J. Edwards

(57) ABSTRACT

Context information of a handshake between a source entity and a target entity is obtained at a security proxy. The context information is transmitted from the security proxy to a key manager. The key manager maintains a first private key of the security proxy. A first handshake message is received from the key manager. The first handshake message (Continued)

is generated at least based on the context information and signed with the first private key. The first handshake message is then transmitted to the target entity.

20 Claims, 10 Drawing Sheets

(56) References Cited

U.S. PATENT DOCUMENTS

| | | | | |
|---|---|---|---|---|
| 2002/0116637 | A1* | 8/2002 | Deitsch | G06F 21/305 |
| | | | | 726/12 |
| 2003/0097592 | A1* | 5/2003 | Adusumilli | H04L 63/0823 |
| | | | | 713/168 |
| 2006/0282662 | A1* | 12/2006 | Whitcomb | H04L 63/0407 |
| | | | | 713/156 |
| 2007/0180510 | A1* | 8/2007 | Long | H04L 63/0823 |
| | | | | 726/10 |
| 2008/0134311 | A1 | 6/2008 | Medvinsky et al. | |
| 2015/0010153 | A1* | 1/2015 | Robertson | H04K 3/226 |
| | | | | 380/278 |
| 2015/0288514 | A1* | 10/2015 | Pahl | H04L 63/166 |
| | | | | 713/171 |
| 2015/0288679 | A1* | 10/2015 | Ben-Nun | H04L 67/141 |
| | | | | 726/10 |
| 2016/0134646 | A1* | 5/2016 | Wing | H04L 63/1408 |
| | | | | 726/23 |

FOREIGN PATENT DOCUMENTS

| | | |
|---|---|---|
| CN | 113595967 A * | 11/2021 |
| KR | 101563562 B1 | 10/2015 |

OTHER PUBLICATIONS

"NetApp® Encryption Power Guide," ONTAP 9, Dec. 2019, 69 pages, https://docs.netapp.com/ontap-9/topic/com.netapp.doc.pow%20nve/Encryption%20of%20data%20at%20rest.pdf.

"External key management," Securing transactions outside of MultiChain, MultiChain © 2019 Coin Sciences Ltd, Dec. 20, 2019, 4 pages, https://www.multichain.com/developers/external-key-management/.

Mell et al., "The NIST Definition of Cloud Computing," Recommendations of the National Institute of Standards and Technology, U.S. Department of Commerce, Special Publication 800-145, Sep. 2011, 7 pages.

Sullivan, "Keyless SSL: The Nitty Gritty Technical Details," The Cloudflare Blog, Cloudflare, Sep. 19, 2014, 25 pages, https://blog.cloudflare.com/keyless-ssl-the-nitty gritty-technical-details/.

"How Does Keyless SSL Work? | Forward Secrecy | Cloudflare," SSL Glossary of Terms, Cloudflare, 19 pages, https://www.cloudflare.com/learning/ssl/keyless-ssl/.

* cited by examiner

PRIVATE KEY MANAGEMENT

BACKGROUND

The present invention relates to data encryption, and more specifically, to methods, systems, and computer program products for private key management.

Currently, applications are being containerized and deployed in a cloud environment, which brings about security requirements. Encryption is a common strategy. For example, network traffic between a client for an application and a server for the application are generally encrypted.

SUMMARY

Some embodiments of the present disclosure can be illustrated as a method. According to the method, context information of a handshake between a source entity and a target entity is obtained at a security proxy. The context information is transmitted from the security proxy to a key manager. Here the key manager maintains a first private key of the security proxy. A first handshake message is then received from the key manager. Here the first handshake message is generated at least based on the context information and signed with the first private key. The first handshake message is then transmitted to the target entity.

Some embodiments of the present disclosure can be illustrated as a second method. According to the second method, context information of a handshake between a source entity and a target entity is received from a security proxy at a key manager. Here the key manager maintains a first private key of the security proxy. Then, a first handshake message directed to the target entity is generated at least based on the context information at the key manager. Here the first handshake message is signed with the first private key of the security proxy. Next, the first handshake message is transmitted to the security proxy.

Some embodiments of the present disclosure can be illustrated as a system. The system comprises a processing unit and a memory coupled to the processing unit. The memory stores instructions that, when executed by the processing unit, perform actions. The actions comprise obtaining context information of a handshake between a source entity and a target entity at a security proxy. The actions also comprise transmitting the context information from the security proxy to a key manager. Here the key manager maintains a first private key of the security proxy. The actions also comprise receiving a first handshake message from the key manager. Here the first handshake message is generated at least based on the context information and signed with the first private key. The actions further comprise transmitting the first handshake message to the target entity.

Some embodiments of the present disclosure can be illustrated as a computer program product. The computer program product is tangibly stored on non-transient machine-readable medium and comprises machine-executable instructions. The machine-executable instructions, when executed on a device, cause the device to perform actions. The actions comprise obtaining context information of a handshake between a source entity and a target entity at a security proxy. The actions also comprise transmitting the context information from the security proxy to a key manager. Here the key manager maintains a first private key of the security proxy. The actions also comprise receiving a first handshake message from the key manager. Here the first handshake message is generated at least based on the context information and signed with the first private key. The actions further comprise transmitting the first handshake message to the target entity.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure. Features and advantages of various embodiments of the claimed subject matter will become apparent as the following Detailed Description proceeds, and upon reference to the drawings, in which like numerals indicate like parts, and in which:

Figure 1:
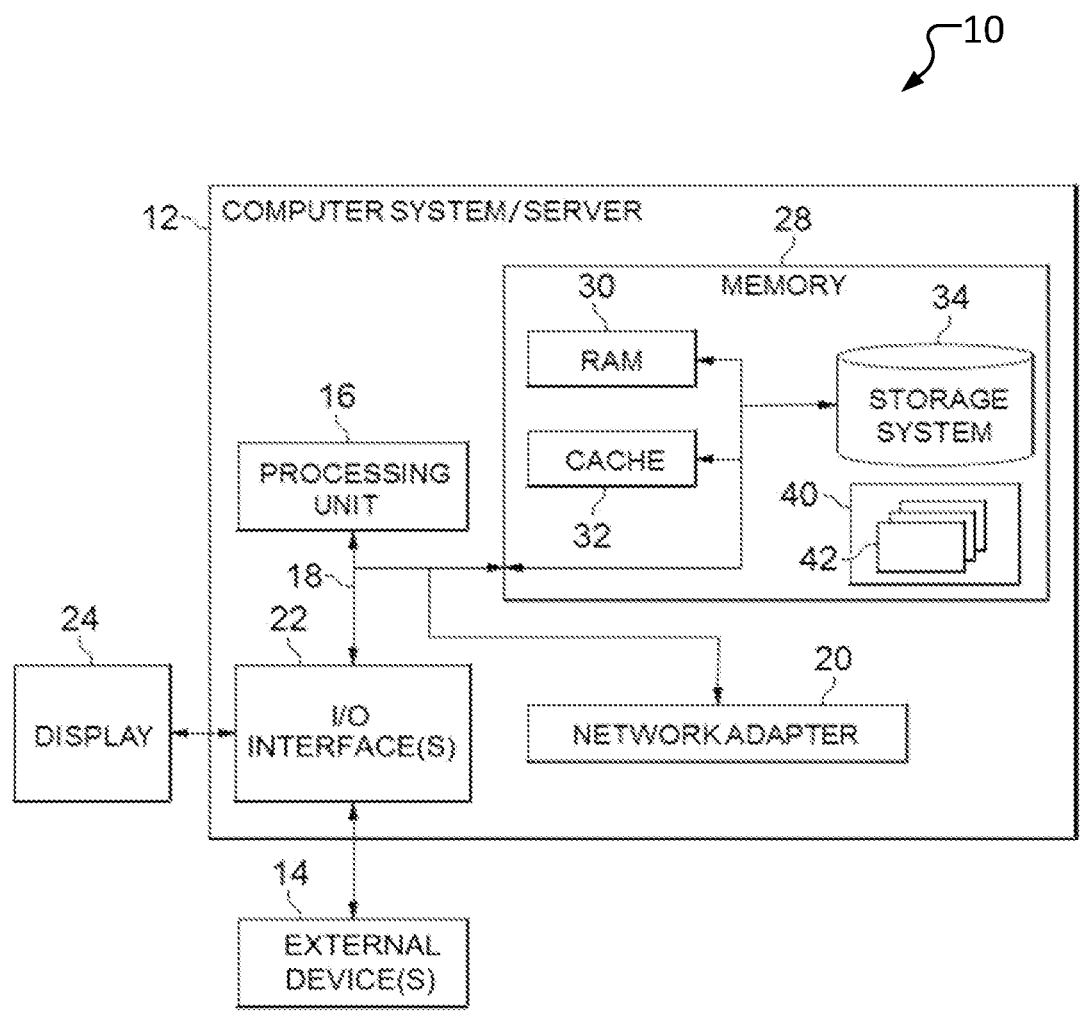
FIG. 1 depicts a cloud computing node according to an embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, a set of one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
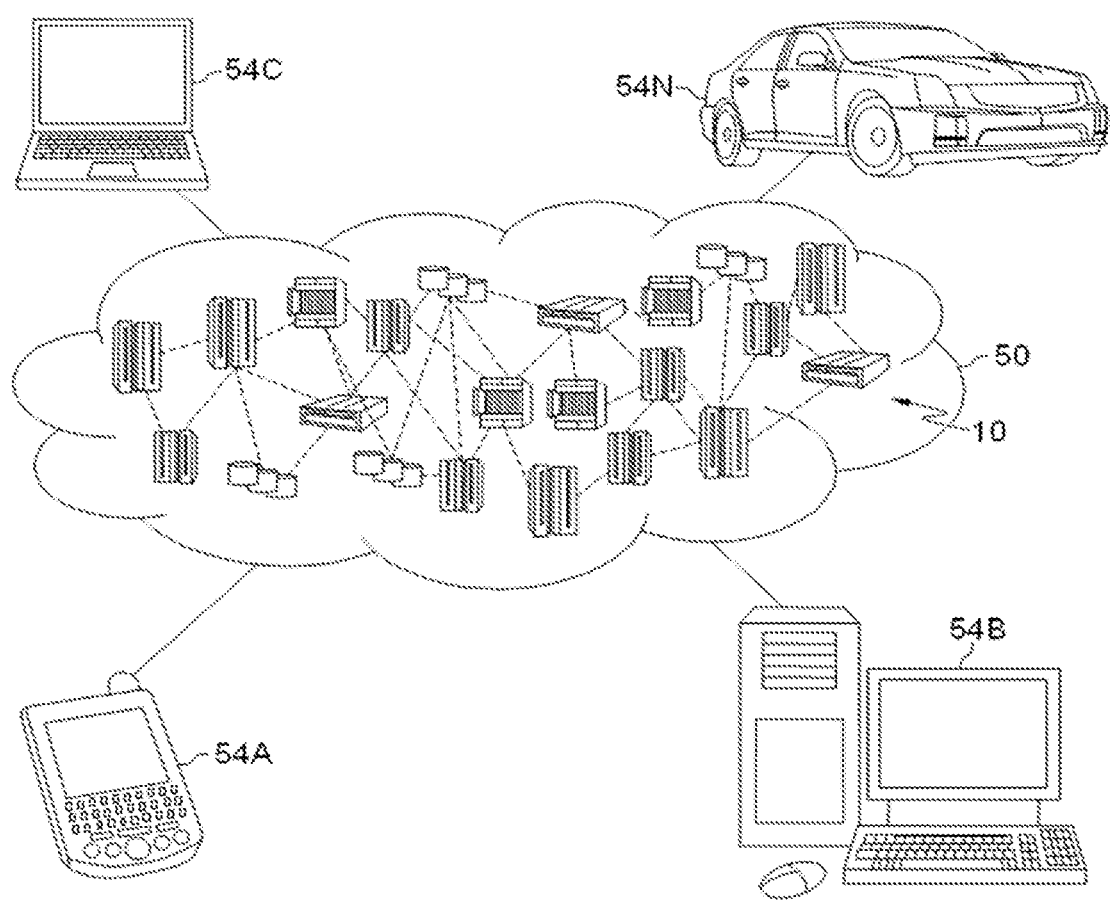
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
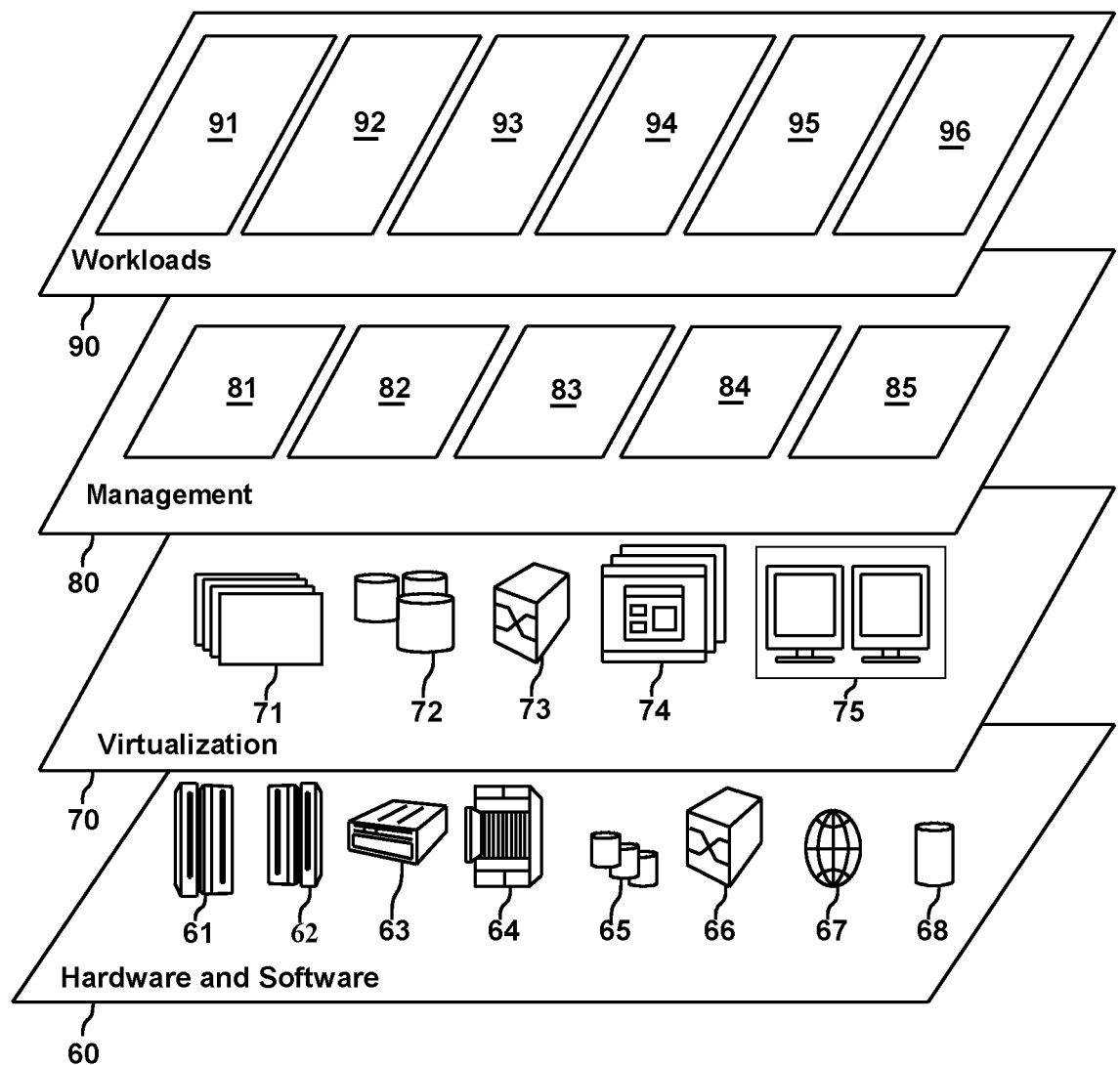
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and private key management 96.

In the cloud environment, traffic is generally encrypted. However, this results in its own security concerns: malicious traffic is also often encrypted and may attack a server without being observed. A cloud security proxy may be introduced to reduce such a security threat. The cloud security proxy may be a containerized proxy product which is located between the client and the server. The cloud security proxy may observe and monitor encrypted traffic to detect malicious behavior and content. To this end and to be transparent to the client, a public key of the cloud security proxy may need to be trusted by the client and the cloud security proxy is required to use a pairing private key to authenticate itself to the client.

Meanwhile, in the cloud environment, the cloud security proxy may be implemented by one or more container instances. However, maintaining the private key in the container instances may increase a risk of the private key being leaked. Moreover, distributing private keys to the container instances may be relatively complex, as the container instances may change frequently in the cloud environment to meet the ever-changing workload.

Embodiments of the present disclosure provide a solution for private key management. In general, according to embodiments of the present disclosure, a key manager instead of a security proxy maintains a private key of the security proxy and handles handshake messages requiring the private key. Context information of a handshake between a source entity and a target entity is obtained at the security proxy and transmitted to the key manager. A handshake message is generated at least based on the context information by the key manager and signed with the private key of the security proxy. The handshake message is then transmitted to the security proxy and forwarded by the security proxy to the target entity.

In the embodiments of the present disclosure, there is proposed a centralized system with enhanced security. In this way, there is no need for the security proxy to store, manage, and protect the private key. The private key of the security proxy can be preserved in a centralized way without being distributed to container instances. This can advantageously reduce risk of leaking the private key. With the proposed solution, a more secure cloud environment can be achieved. Moreover, with the centralized system, individual configuration for the private key of the security proxy is not needed and change to the configuration of the security proxy can be handled at the key manager. In this way, it is easier to update and manage the private key of the security proxy.

In some embodiments, information concerning the handshake message can be prepared in advance at the security proxy and the key manager. Historical context information of a historical handshake involving the source entity may be obtained in advance. Once the handshake is initiated by the target entity, the key manager may generate the handshake message without waiting for a response from the source entity. In such embodiments, the time required for the handshake can be reduced and transaction flow between the source and target entities can thus be improved. In this way, a more efficient handshake can be achieved.

Even if the security proxy is not deployed in the cloud environment, the above advantages of the present disclosure can also be achieved. Other advantages of the present disclosure will be described with reference to the example embodiments and the accompanying drawings below.

Figure 4:
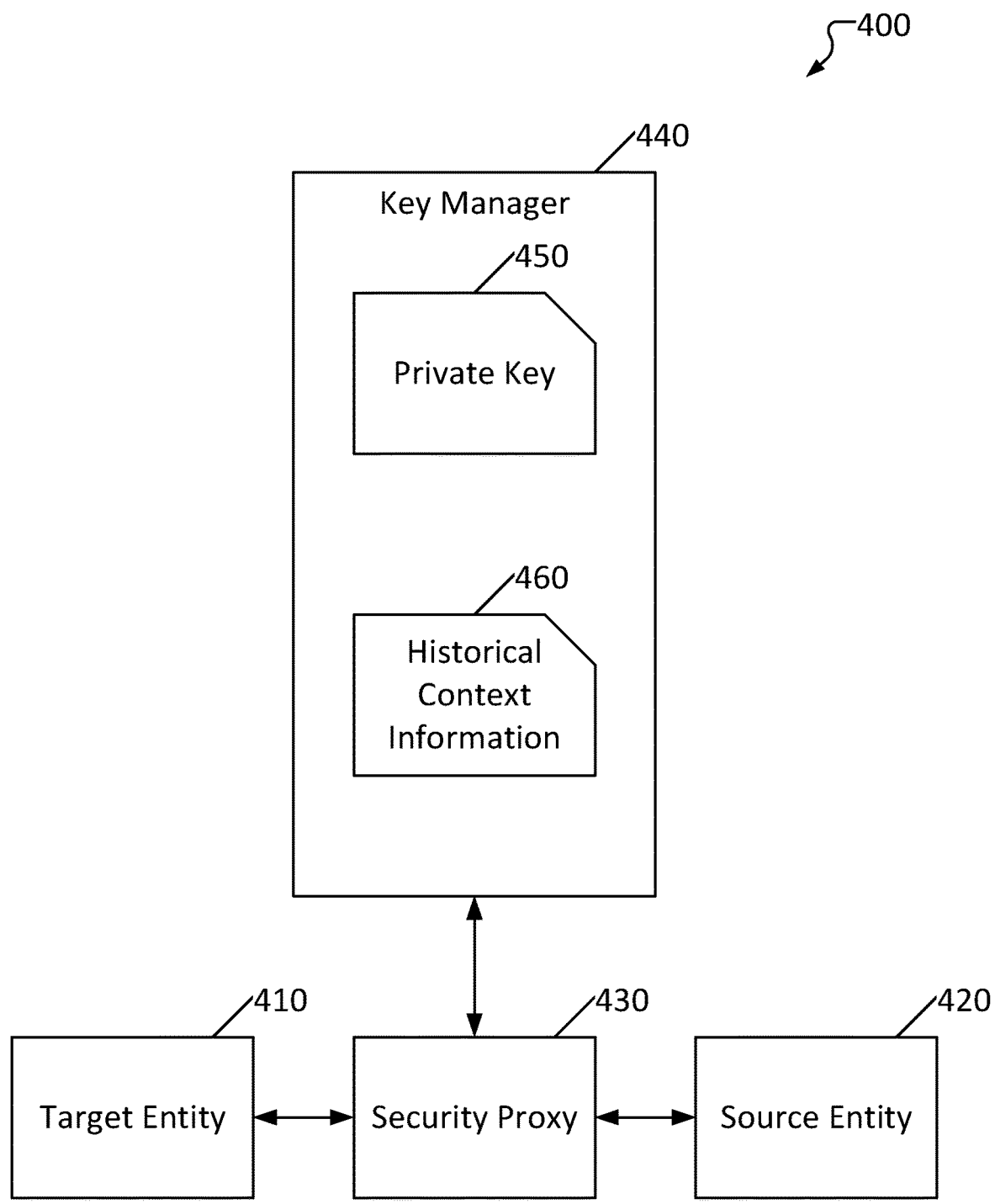
FIG. 4 depicts an environment in which embodiments of the present disclosure can be implemented.

FIG. 4 depicts an environment 400 in which embodiments of the present disclosure can be implemented. It is to be understood that the structure and functionality of the environment 400 are described only for the purpose of illustration without suggesting any limitations as to the scope of the present disclosure. In general, the environment 400 comprises a target entity 410, a source entity 420, a security proxy 430 and a key manager 440.

As shown in FIG. 4, the security proxy 430 is located between the target entity 410 and the source entity 420. Specifically, the security proxy 430 may serve as an authorized entity establishing a first secure connection between the target entity 410 and the security proxy 430, and a second secure connection between the security proxy 430 and the source entity 420. With these two secure connections, the security proxy 430 may receive encrypted communications from the target entity 410 over the first secure connection. If the encrypted communications are directed to the source entity 420, the security proxy 430 may forward the communications to the source entity 420 over the second secure connection. An inverse process may be performed when encrypted communications are received from the source entity 420 over the second secure connection. As an example, the security proxy 430 may be configured to provide a Transport Layer Security (TLS). In such example, the security proxy 430 may be a TLS proxy.

In some embodiments, the security proxy 430 may be implemented in a cloud environment. For example, the security proxy 430 may be implemented by one or more container instances. In some embodiments, the security proxy 430 may be implemented in one or more local devices.

The target entity 410 and the source entity 420 may be any suitable entities which communicate with each other via the security proxy 430. In some embodiments, one of the target entity 410 and the source entity 420 may be a client and the other one of the target entity 410 and the source entity 420 may be a server. As an example, without any limitation as to the scope of the present disclosure, the target entity 410 may be a TLS client and the source entity 420 may be a TLS server.

To communicate with each other, for example, to exchange application data, a handshake between the target entity 410 and the source entity 420 is required. Due to presence of the security proxy 430, the handshake may comprise a handshake sequence between the target entity 410 and the security proxy 430 as well as another handshake sequence between the source entity 420 and the security proxy 430. One or more handshake messages communicated among the target entity 410, the security proxy 430 and the source entity 420 may need to be signed with a private key of a sender of the handshake messages. For example, a handshake message for certificate verification is required to be signed with the private key of the sender.

As used herein, the term "source" is used with respect to an origin of a message (e.g., a handshake message), while the term "target" is used with respect to a destination of the message. In the following, the target entity 410 and the source entity 420 may be referred to as "entities" collectively or as an "entity" individually.

As shown in FIG. 4, the key manager 440 can communicate with the security proxy 430 over a secure connection. The key manager 440 is configured to maintain a private key 450 of the security proxy 430 and handle a message requiring the private key 450 in place of the security proxy 430. The key manager 440 may be implemented in any suitable manner. For example, the key manager 440 may be implemented by a component in the cloud environment. Alternatively, the key manager 440 may be implemented by one or more devices, for example, a server.

The key manager 440 is configured to receive context information of the handshake between the source entity 420 and the target entity 410 from the security proxy 430 and generate a handshake message at least based on the context information and the private key 450. As used herein, the term "context information" of the handshake refers to at least a part of information having been exchanged during the handshake, for example, messages having been communicated among the target entity 410, the security proxy 430 and the source entity 420.

In some embodiments, the key manager 440 may store historical context information 460 of a historical handshake involving the source entity 420. Specifically, the historical context information may be related to the source entity 420. The key manager 440 may generate the handshake message further based on the historical context information. Although not shown, in some embodiments, the security proxy 430 may also store the historical context information 460.

The number of elements shown in FIG. 4 is provided for the purpose of illustration only; there may be any suitable number of elements. For example, there may be more entities served by the security proxy 430. The key manager 440 may maintain private keys of more than one security proxy.

Figure 5:
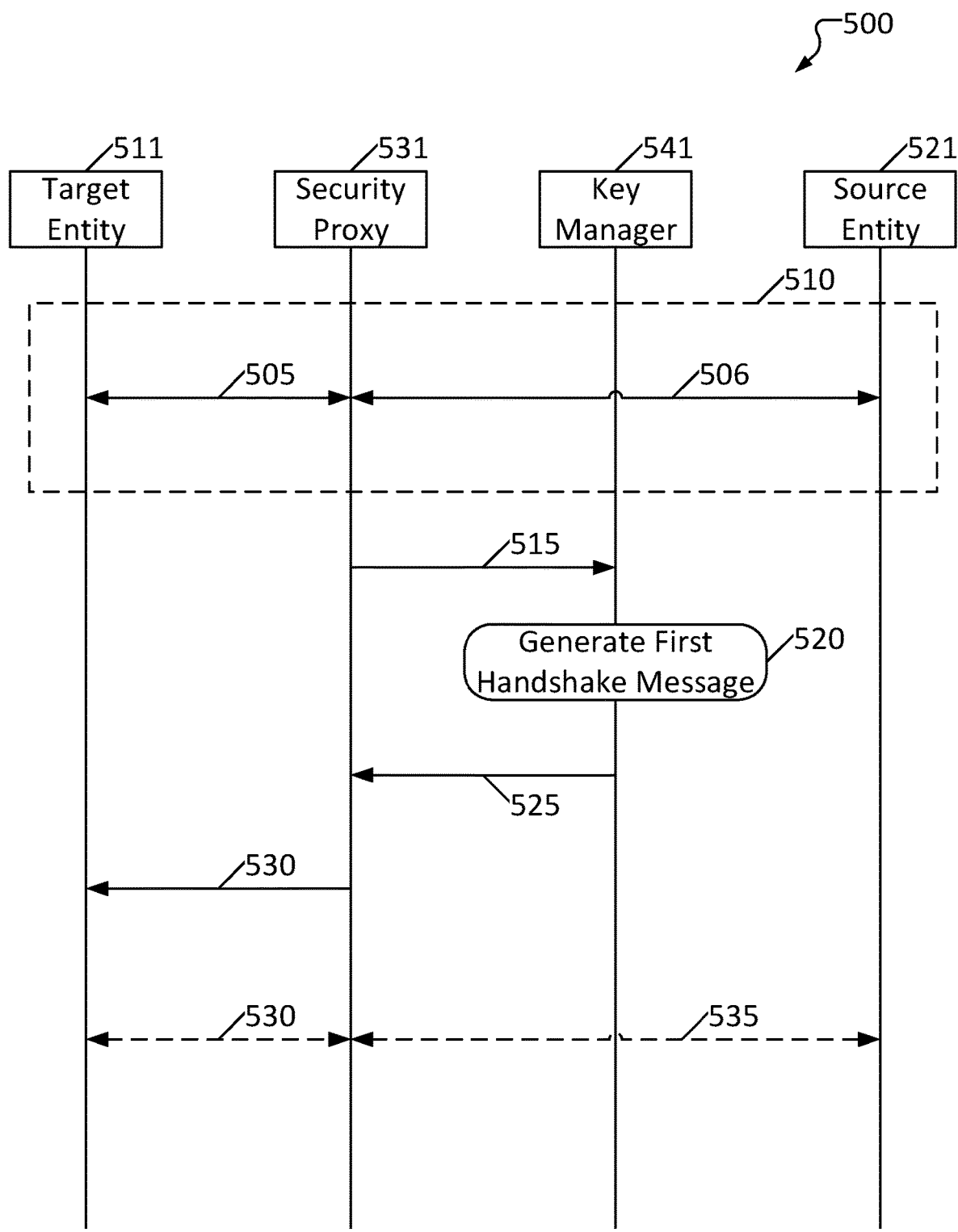
FIG. 5 depicts a diagram of an example process for private key management according to some embodiments of the present disclosure.

FIG. 5 depicts a diagram of an example process 500 for private key management according to some embodiments of the present disclosure. As shown in FIG. 5, the process 500 may involve a target entity 511, a security proxy 531, a key manager 541 and a source entity 521. These components may correspond to target entity 410, security proxy 430, key manager 440 and source entity 420, respectively, as shown in FIG. 4.

A handshake between the target entity 511 and the source entity 521 may be initiated for mutual authentication. Handshake messages are communicated between the target entity 511 and the source entity 521 via the security proxy 531. A handshake message (which is also referred to as "first handshake message"), for example a message for certificate verification, may require a private key (which is also referred to as "first private key") of the security proxy 531.

The security proxy 531 obtains 510 context information of the handshake between the source entity 521 and the target entity 511 and then transmits 515 the context information to the key manager 541. The context information may comprise a part or all of information having been exchanged during the handshake. For example, the context information may comprise messages 505, 506 having been communicated among the target entity 511, the security proxy 531 and the source entity 521 during the handshake.

In some embodiments, the security proxy 531 may receive a handshake message (which is also referred to as "second handshake message") from the source entity 521 as at least part of the context information. The second handshake message is directed to the target entity 511 and signed with a private key (which is also referred to as "second private key") of the source entity 521. As an example, the second handshake message may be a certificate verify (CV) message for verifying a certificate. The CV message may comprise a signature of the source entity 521, which is generated based on the private key of the source entity 521.

Upon receiving the second handshake message, the security proxy 531 may transmit the second handshake message to the key manager 541. Additionally, in some embodiments, the security proxy 531 may further transmit a handshake key used between the target entity 511 and the security proxy 531 to the key manager 541. The handshake key may be determined based on key exchange information from the target entity 511. In this way, the key manager 541 may encrypt the first handshake message with the handshake key. An example of these embodiments will be described below with reference to FIG. 6.

In some embodiments, the security proxy 531 may receive a "hello" message (which is also referred to as "first hello message") from the target entity 511 as at least a part of the context information. The first hello message may be directed to the source entity 521 for initiating the handshake. In the case where the target entity 511 is a client, the first hello message may be a client hello message. The first hello message may comprise key exchange information for encrypting the handshake sequence between the target entity 511 and the security proxy 531. For example, the first hello message may comprise at least a key share entry indicating parameters for key exchange with the security proxy 531.

Upon receiving the first hello message from the target entity 511, the security proxy 531 may transmit the first hello message to the key manager 541. In addition, in some embodiments, the security proxy 531 may have prepared some of information required to generate the first handshake message in advance. The security proxy 531 may obtain historical context information (such as, for example, historical context information 460 as depicted in FIG. 4) of a historical handshake involving the source entity 521 before receiving the first hello message. The historical context information may comprise a hello message from the source entity 521, a certificate of the source entity 521, any related handshake message from the source entity 521.

The historical context information may be obtained during any suitable historical handshake involving the source entity 521. As an example, the historical context information may be obtained when the security proxy 531 serves the handshake involving the source entity 521 for the first time. As another example, the historical context information may be obtained during the latest handshake involving the source entity 521.

In some embodiments, the historical context information may be transmitted to the key manager 541 once the historical context information is obtained. In some embodiments, the historical context information may be transmitted to the key manager 541 along with the first hello message. An example of these embodiments will be described below with reference to FIG. 7.

Upon receiving 515 the context information from the security proxy 531, the key manager 541 generates 520 the first handshake message at least based on the context information. The first handshake message is signed with a first private key (not shown) of the security proxy 531. The private key may, for example, correspond to private key 450 as depicted in FIG. 4. For example, the key manager 541 may generate a signature of the security proxy 531 based on the first private key and include the signature in the first handshake message.

In the above embodiments where the second handshake message from the source entity 521 is received as the context information, the key manager 541 may generate 520 the first handshake message based on the second handshake message and the first private key. For example, the key manager 541 may replace the signature of the source entity 521 in the second handshake message with the signature of the security proxy 531.

In addition, if the handshake key used between the target entity 511 and the security proxy 531 is transmitted to the key manager 541, the key manager 541 may encrypt the first handshake message with the handshake key.

In the above embodiments where the first hello message from the target entity 511 is received 515 as the context information, the key manager 541 may generate 520 the first handshake message based on the first hello message and the historical context information. The key manager 541 may generate the signature of the security proxy 531 based on the first private key and include the signature in the first handshake message. In these embodiments, the first hello message may provide information concerning the target entity 511, while the historical context information may provide information concerning the source entity 521.

In addition, if a set of parameters for determining the handshake key used between the target entity 511 and the security proxy 531 is transmitted from the security proxy 531 to the key manager 541, the key manager 541 may determine the handshake key based on the set of parameters and the first hello message. For example, the set of parameters may comprise a key share entry determined by the security proxy 531 and the first hello message may comprise another key share entry determined by the target entity 511. The handshake key may be determined based on these key share entries. Then, the key manager 541 may encrypt the first handshake message with the handshake key.

After generating 520 the first handshake message, the key manager 541 transmits 525 the first handshake message to the security proxy 531. Then, the security proxy 531 transmits 530 the first handshake message to the target entity 511. If the first handshake message received from the key manager 541 has been encrypted with the handshake key, the security proxy 531 may forward 530 the first handshake message to the target entity 511 directly. If the first handshake message received from the key manager 541 has not been encrypted with the handshake key, the security proxy 531 may first encrypt the first handshake message with the handshake key and transmit 530 the encrypted first handshake message to the target entity 511.

As shown in FIG. 5, the handshake between the source entity 521 and the target entity 511 continues with subsequent procedures. For example, the handshake sequence between the target entity 511 and the security proxy 531 may be performed 535. The handshake sequence between the source entity 521 and the security proxy 531 may be performed 540.

In the embodiments of the present disclosure, there is no need for the security proxy to store, manage, and protect the private key. The private key of the security proxy can be preserved in a centralized way without being distributed to container instances. The risk to leak the private key can thus be reduced and even avoided. Therefore, a more secure cloud environment is achieved. Moreover, with the centralized system, update and management of the security proxy can be handled at the key manager. In this way, it is easier to update and manage the private key of the security proxy.

Figure 6:
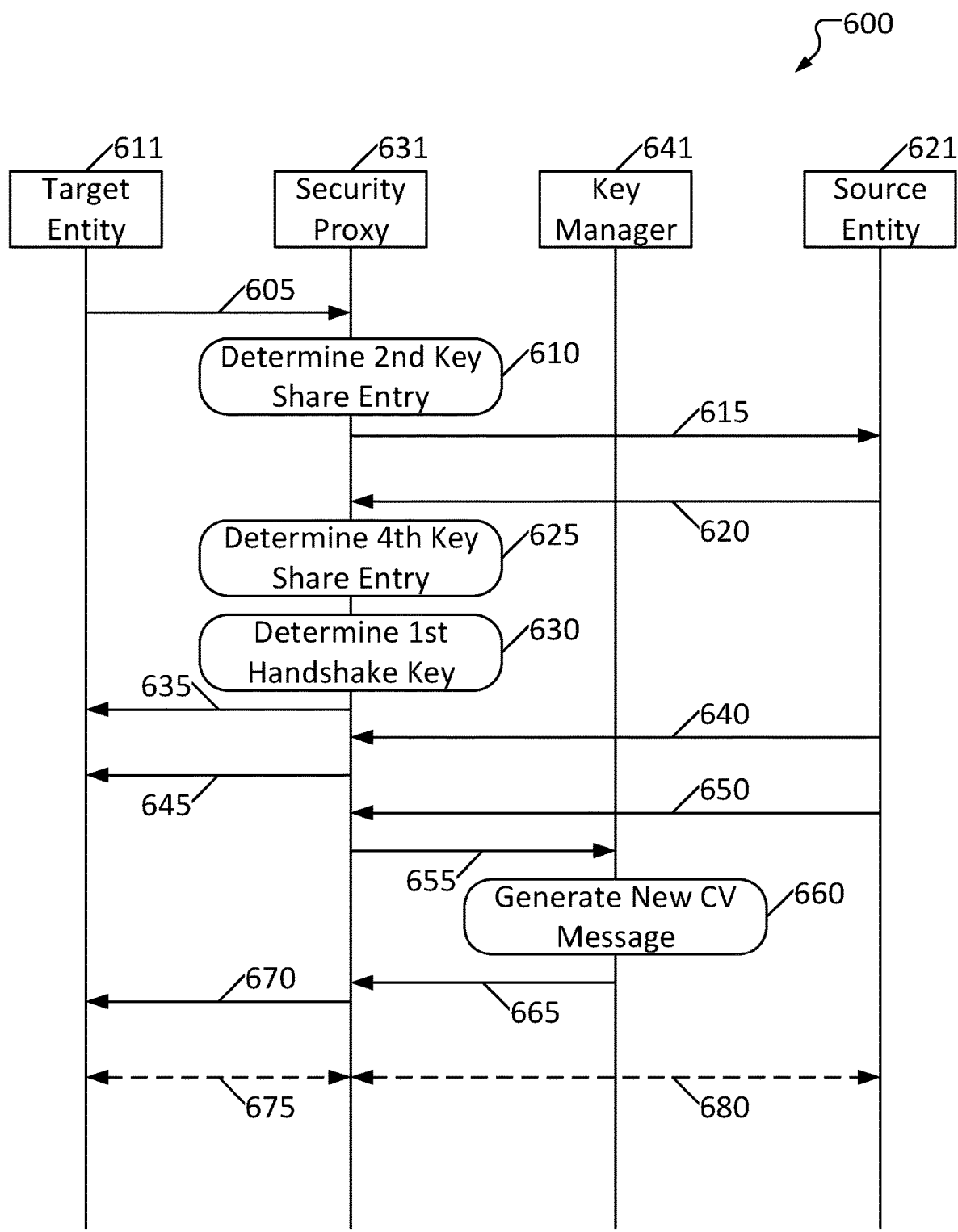
FIG. 6 depicts a diagram of an example process for private key management according to some embodiments of the present disclosure.

As mentioned above, in some embodiments, the second handshake message from the source entity 521 may be used as the context information. Now reference is made to FIG. 6. FIG. 6 depicts a diagram of an example process 600 for private key management according to some embodiments of the present disclosure. The process 600 may be considered as one possible implementation of the process 500. As shown in FIG. 6, the process 600 may involve a target entity 611, a security proxy 631, a key manager 641 and a source entity 621. These components may correspond to target entity 410, security proxy 430, key manager 440 and source entity 420, respectively, as shown in FIG. 4. Only for purpose of discussion without any limitation as to the scope of the present disclosure, in the process 600, the source entity 621 is a server, the target entity 611 is a client, and the first and second handshake messages are CV messages.

As shown in FIG. 6, the target entity 611 may transmit 605 a client hello message (which is also referred to as "first client hello message") to the security proxy 631 to initiate the handshake between the target entity 611 and the source entity 621. The first client hello message may at least comprise a key share entry (which is also referred to as "first key share entry") indicating parameters for key exchange with the security proxy 631. The first client hello message may further comprise other key exchange information, for example, a protocol version, cryptographic algorithms.

The security proxy 631 may determine 610 another key share entry (which is also referred to as "second key share entry") indicating parameters for key exchange with the source entity 621. The security proxy 631 may generate an updated client hello message (which is also referred to as "second client hello message") by replacing the first key share entry with the second key share entry and then transmit 615 the second client hello message to the source entity 621.

Upon receiving the second client hello message, the source entity 621 may transmit 620 to the security proxy 631 a server hello message (which is also referred to as "first server hello message") as a response. The first server hello message may at least comprise a key share entry (which is also referred to as "third key share entry") indicating parameters for key exchange with the security proxy 631.

The security proxy 631 may determine 625 another key share entry (which is also referred to as "fourth key share entry") indicating parameters for key exchange with the target entity 611. The security proxy 631 may determine 630 a first handshake key used between the target entity 611 and the security proxy 631 based on the first and fourth key share entries, as well as a second handshake key used between the source entity 621 and the security proxy 631 based on the second and third key share entries. The security proxy 631 may transmit 635 another server hello message (which is referred to as "second server hello message) to the target entity 611. The second hello message may at least comprise the fourth key share entry.

After transmitting 620 the first server hello message to the security proxy 631, the source entity 621 may transmit 640 to the security proxy 631 a certificate of the source entity 621, which in this example is a server certificate. Then, the security proxy 631 may forward 645 the server certificate to the target entity 611.

The source entity 621 may further transmit 650 a message (which is also referred to as an "original CV message") for verifying the server certificate to the security proxy 631. The security proxy 631 may at least transmit 655 the original CV message to the key manager 641 as the context information. In some embodiments, the security proxy 631 may further transmit the first handshake key used between the target entity 611 and the security proxy 631 to the key manager 641. The security proxy 631 may transmit other related context information to the key manager 641.

The key manager 641 may then generate 660 a new CV message based on the original CV message and a private key (not shown). The private key may, for example, correspond to private key 450 as depicted in FIG. 4. For example, the new CV message may comprise a signature generated based on the private key. If the first handshake key is also transmitted to the key manager 641, the key manager 641 may encrypt the new CV message with the private key.

The key manager 641 may then transmit 665 the new CV message to the security proxy 631. The security proxy 631 may forward 670 the new CV message to the target entity 611. As shown in FIG. 6, the handshake between the source entity 621 and the target entity 611 continues with subsequent procedures. For example, the handshake sequence between the target entity 611 and the security proxy 631 may be performed 675. The handshake sequence between the source entity 621 and the security proxy 631 may be performed 680.

It has been recognized that the source and target entities, for example, a TLS server and a TLS client, may be basically unchanged and thus the only differences between handshakes are parameters for key exchange, for example, key share entries. Therefore, in some embodiments, some of the information required to generate the first handshake message may be prepared in advance.

Figure 7:
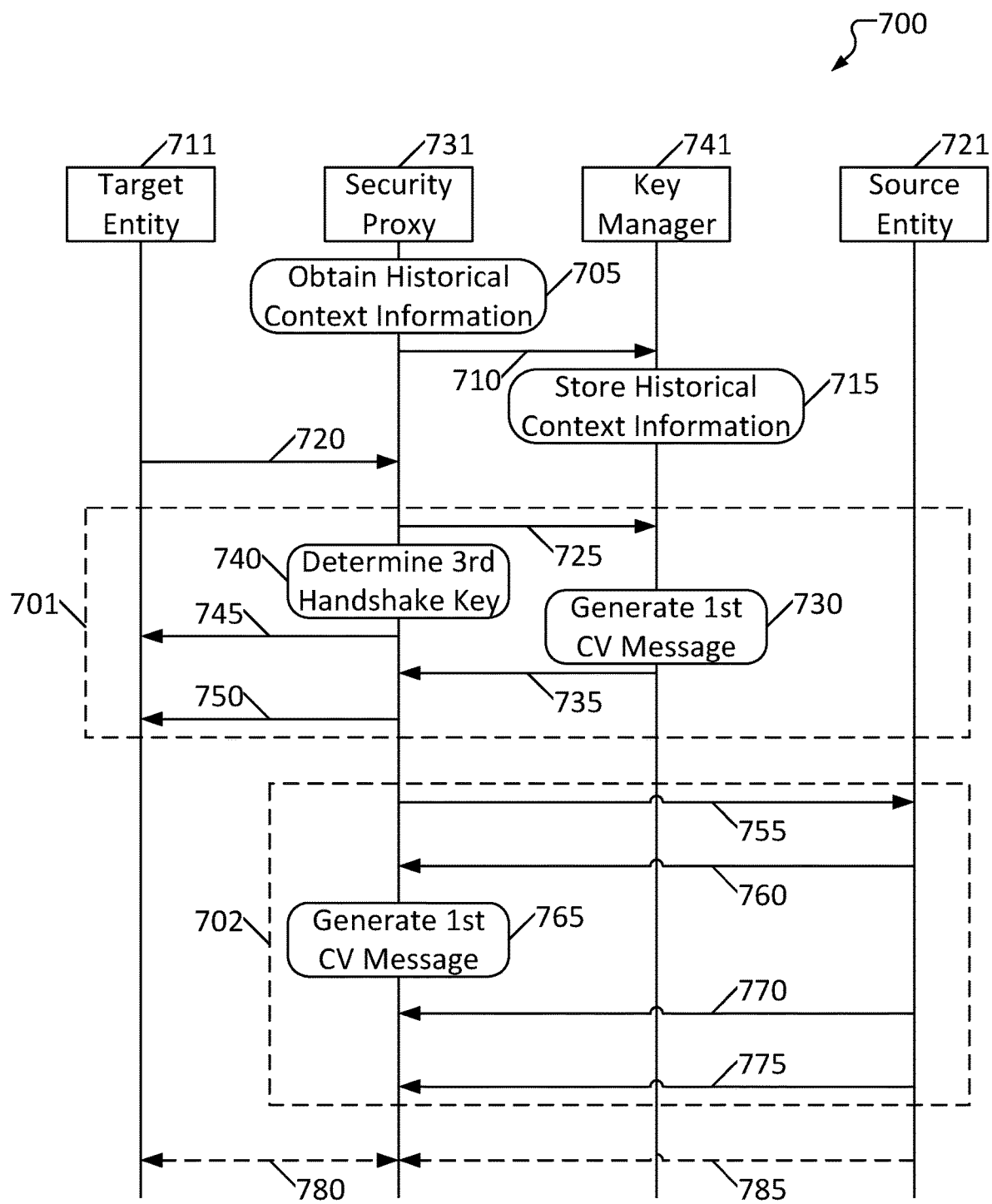
FIG. 7 depicts a diagram of an example process for private key management according to some embodiments of the present disclosure.

FIG. 7 depicts a diagram of an example process 700 for private key management according to some embodiments of the present disclosure. The process 700 may be considered as another possible implementation of the process 500. As shown in FIG. 7, the process 700 may involve a target entity 711, a security proxy 731, a key manager 741 and a source entity 721. These components may correspond to target entity 410, security proxy 430, key manager 440 and source entity 420, respectively, as shown in FIG. 4. Only for purpose of discussion without any limitation to the scope, in the process 700, the source entity 721 may be a server, the target entity 711 may be a client, and the first and second handshake messages may be CV messages.

As shown in FIG. 7, the security proxy 731 may obtain 705 historical context information (such as, for example, historical context information 460 as depicted in FIG. 4) of a historical handshake involving the source entity 721. In this example, the historical context information may comprise a server hello message (which is also referred to as "previous server hello message") from the source entity 721 and a server certificate (which is also referred to as "previous server certificate") of the source entity 721. For example, the security proxy 731 may receive the previous server hello message and the previous server certificate from the source entity 721 when the security proxy 731 serves a handshake involving the source entity 721 for the first time or during the latest handshake involving the source entity 721.

The security proxy 731 may transmit 710 the historical context information to the key manager 741. The key manager 741 may store 715 the historical context information for example in a cache or any suitable storage device.

In some embodiments, the security proxy 731 may determine key share entries indicating parameters for key exchange with the source entity 721 and the target entity 711 in advance. For example, a fifth key share entry indicating parameters for key exchange with the source entity 721 and a sixth key share entry indicating parameters for key exchange with the target entity 711 may be prepared by the security proxy 731 in advance. In addition, the security proxy 731 may transmit the prepared key share entries to the key manager 741.

As such, the security proxy 731 and the key manager 741 may be prepared for a handshake between the target entity 711 and the source entity 721. As shown in FIG. 7, the target entity 711 may transmit 720 a client hello message (which is also referred to as an "original client hello message") to the security proxy 731 to initiate the handshake between the target entity 711 and the source entity 721. The original client hello message may at least comprise a seventh key share entry indicating parameters for key exchange with the security proxy 731.

Upon receiving 720 the original client hello message from the target entity 711, two sub-processes 701 and 702 can be performed. Though sub-processes 701 and 702 are depicted in sequence in FIG. 7, this is merely for simplicity of illustration; 701 and 702 can be performed in parallel. In the sub-process 701, the security proxy 731 may transmit 725 the original client hello message to the key manager 741 directly. The key manager 741 may generate 730 a first CV message signed with a private key (not shown). The private key may, for example, correspond to private key 450 as depicted in FIG. 4. For example, the first CV message may be generated based on the original client hello message, the previous server hello message and the previous server certificate. The first CV message may comprise a signature of the security proxy 731 generated based on the first private key.

In some embodiments, if the sixth key share entry indicating parameters for key exchange with the target entity 711 is transmitted to the key manager 741, the key manager 741 may determine a handshake key (which is also referred to as "third handshake key") used between the target entity 711 and the security proxy 731 based on the sixth key share entry and the seventh key share entry in the original client hello message. The key manager 741 may encrypt the first CV message with the third handshake key. Next, the key manager 741 may transmit 735 the first CV message to the security proxy 731.

As shown in FIG. 7, upon receiving 720 the original client hello message from the target entity 711, the security proxy 731 may determine 740 the third handshake key based on the sixth key share entry and the seventh key share entry in the original client hello message. In some embodiments, the security proxy 731 may generate a server hello message (which may be referred to as "a second hello message") as a response to the original client hello message. This server hello message may be generated based on the previous server hello message and comprise the sixth key share entry which has been prepared in advance. Then, the security proxy 731 may transmit 745 this server hello message to the target entity 711. The security proxy 731 may also transmit 750 the first CV message and the previous server certificate to the target entity 711.

The sub-process 702 is now described. Upon receiving 720 the original client hello message from the target entity 711, the security proxy 731 may generate a new client hello message based on the original client hello message and the fifth key share entry which is prepared in advance. The new client hello message may be generated by replacing the seventh key share entry in the original client hello message with the fifth key share entry. Then, the security proxy 731 may transmit 755 the new client hello message to the source entity 721.

The source entity 721 may transmit 760 a server hello message to the security proxy 731 as a response. This server hello message may comprise an eighth key share entry indicating parameters for key exchange with the security proxy 731. The security proxy 731 may determine 765 a handshake key used between the source entity 721 and the security proxy 731 based on the fifth key share entry and the eighth key share entry. Subsequently, the source entity 721 may transmit 770 a new server certificate and transmit 775 a new CV message to the security proxy 731. In some embodiments, this server hello message and the new server certificate may be used to update the historical context information. For example, the new server certificate may replace the previous server certificate. As such, the sub-process 702 can be considered being completed.

As shown in FIG. 7, the handshake between the source entity 721 and the target entity 711 continues with subsequent procedures after both the sub-processes 701 and 702 are completed. For example, the handshake sequence between the target entity 711 and the security proxy 731 may be performed 780. The handshake sequence between the source entity 721 and the security proxy 731 may be performed 785.

In such embodiments, a handshake sequence as shown in sub-process 701 between the target entity 711 and the security proxy 731 can be performed by means of the previous server hello message and the previous server certificate. The security proxy 731 may be not required to wait for the new server hello message and the new CV message from the source entity 721. In this way, the time required for the handshake can be reduced and the efficiency of the handshake can be improved.

Figure 8:
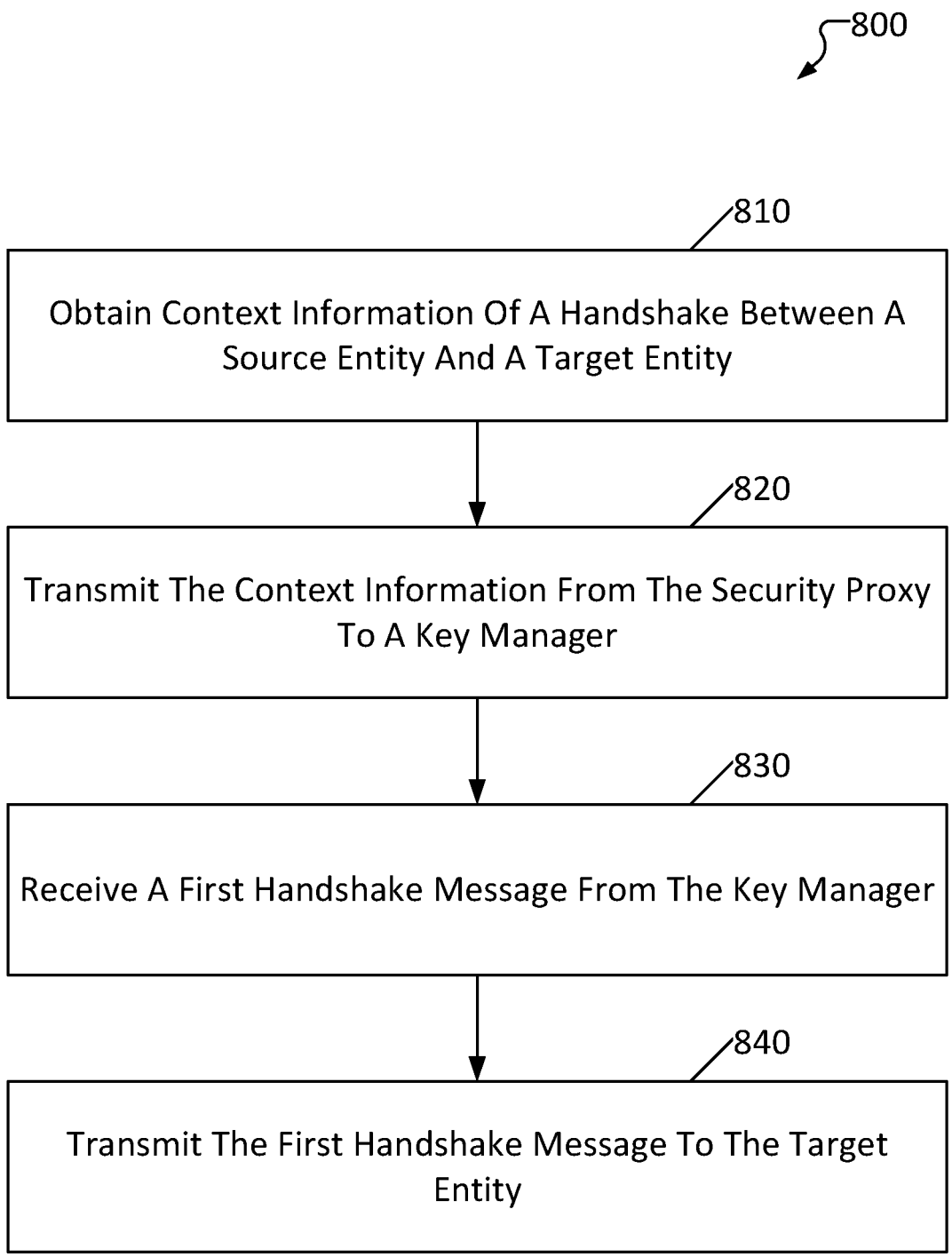
FIG. 8 depicts a flowchart of an example method according to some embodiments of the present disclosure.

FIG. 8 depicts a flowchart of an example method 800 according to some embodiments of the present disclosure. For example, the method 800 may be implemented at the security proxy 430 as shown in FIG. 4. It is to be understood that the method 800 may also comprise additional blocks (not shown) and/or may omit the illustrated blocks. The scope of the present disclosure described herein is not limited in this aspect.

At block 810, the security proxy 430 obtains context information of a handshake between a source entity and a target entity. At block 820, the security proxy transmits the context information to a key manager. The key manager maintains a first private key of the security proxy. At block 830, the security proxy receives a first handshake message from the key manager. The first handshake message is generated at least based on the context information and signed with the first private key. At block 840, the security proxy 430 transmits the first handshake message to the target entity.

In some embodiments, the security proxy may receive a second handshake message from the source entity as at least a part of the context information. The second handshake message may be directed to the target entity and signed with a second private key of the source entity. For example, a CV message from the source entity may be received as at least a part of the context information. In some embodiments, the security proxy may further transmit a handshake key used between the security proxy and the target entity to the key manager. The first handshake message may be encrypted with the handshake key.

In some embodiments, the security proxy may receive a first hello message from the target entity as at least a part of the context information. The first hello message is directed to the source entity for initiating the handshake. In some embodiments, the security proxy may further obtain historical context information of a historical handshake involving the source entity, and transmit the historical context information to the key manager. For example, the historical context information may comprise a server hello and a server certificate from the source entity. In these embodiments, the first handshake message may be generated based on the historical context information and the first hello message.

In some embodiments, the security proxy may further determine a second hello message as a response to the first hello message based on the historical context information. The security proxy may transmit the second hello message to the target entity.

In some embodiments, the security proxy may further transmit to the key manager a set of parameters for determining a handshake key used between the security proxy and the target entity. In these embodiments, the first handshake message may be encrypted with the handshake key determined based on the set of parameters and the first hello message.

Figure 9:
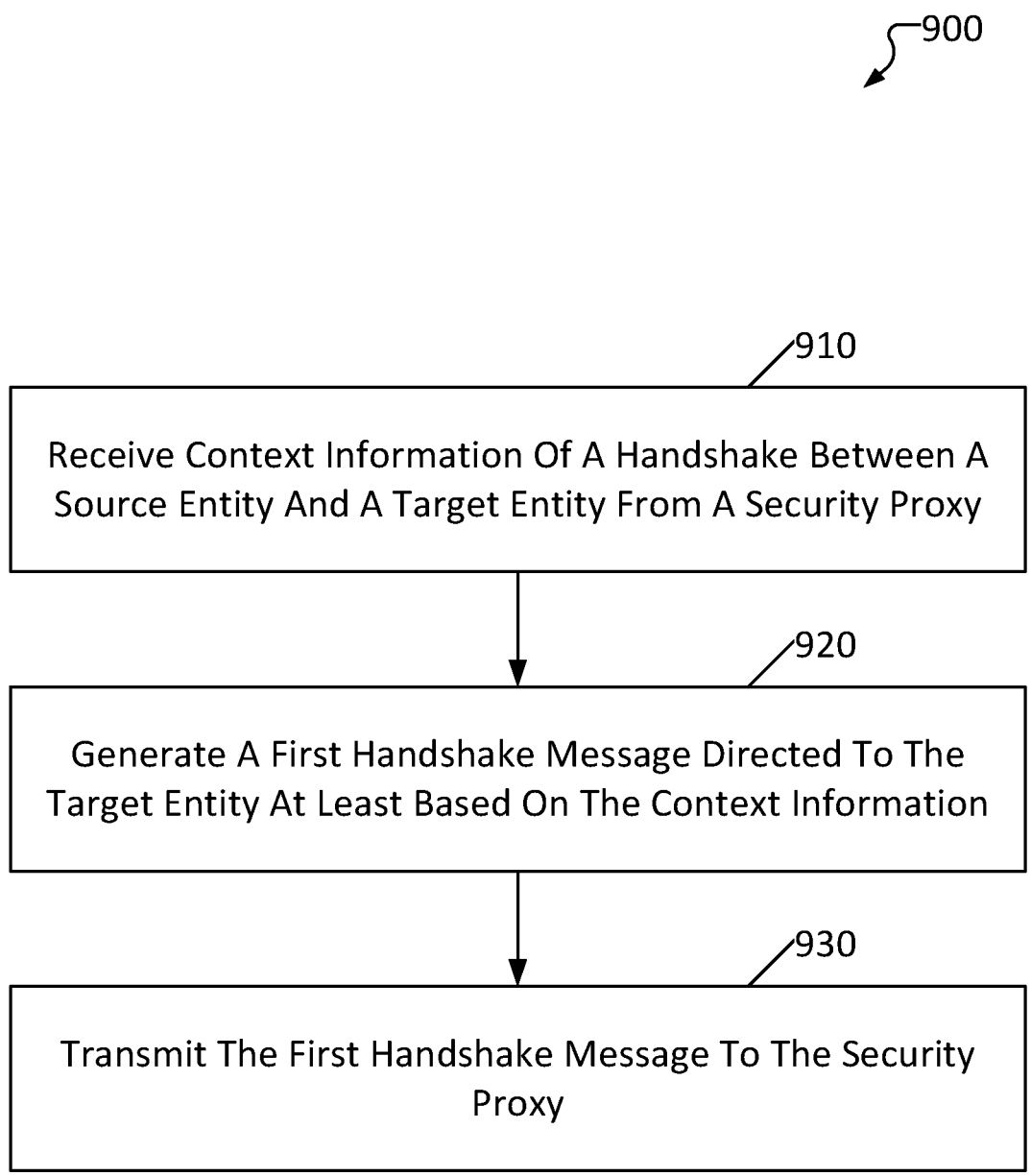
FIG. 9 depicts a flowchart of an example method according to some embodiments of the present disclosure.

FIG. 9 depicts a flowchart of an example method 900 according to some embodiments of the present disclosure. For example, the method 900 may be implemented at a key manager, such as key manager 440 as shown in FIG. 4. It is to be understood that the method 900 may also comprise additional blocks (not shown) and/or may omit the illustrated blocks. The scope of the present disclosure described herein is not limited in this aspect.

At block 910, the key manager receives context information of a handshake between a source entity and a target entity from a security proxy. At block 920, the key manager generates a first handshake message directed to the target entity at least based on the context information. The first handshake message is signed with a first private key of the security proxy maintained by the key manager. At block 930, the key manager transmits the first handshake message to the security proxy.

In some embodiments, the key manager may receive a second handshake message from the security proxy as at least a part of the context information. The second handshake message may be directed to the target entity and signed with a second private key of the source entity. For example, a CV message may be received as at least a part of the context information. In some embodiments, the key manager may further receive a handshake key used between the security proxy and the target entity from the security proxy. The key manager may encrypt the first handshake message with the handshake key.

In some embodiments, the key manager may receive a first hello message from the security proxy as at least a part of the context information. The first hello message may be directed to the source entity for initiating the handshake. In some embodiments, the key manager may further receive historical context information of a historical handshake involving the source entity from the security proxy. For example, the historical context information may comprise a server hello and a server certificate from the source entity. The key manager may generate the first handshake message based on the historical context information and the first hello message.

In some embodiments, the key manager may further receive from the security proxy a set of parameters for determining a handshake key used between the security proxy and the target entity, and determine the handshake key based on the set of parameters and the first hello message. The key manager may encrypt the first handshake message with the handshake key.

The processing of private key management or the security proxy/the key manager according to embodiments of this disclosure could be implemented by computer system/server 12 of FIG. 1.

Figure 10:
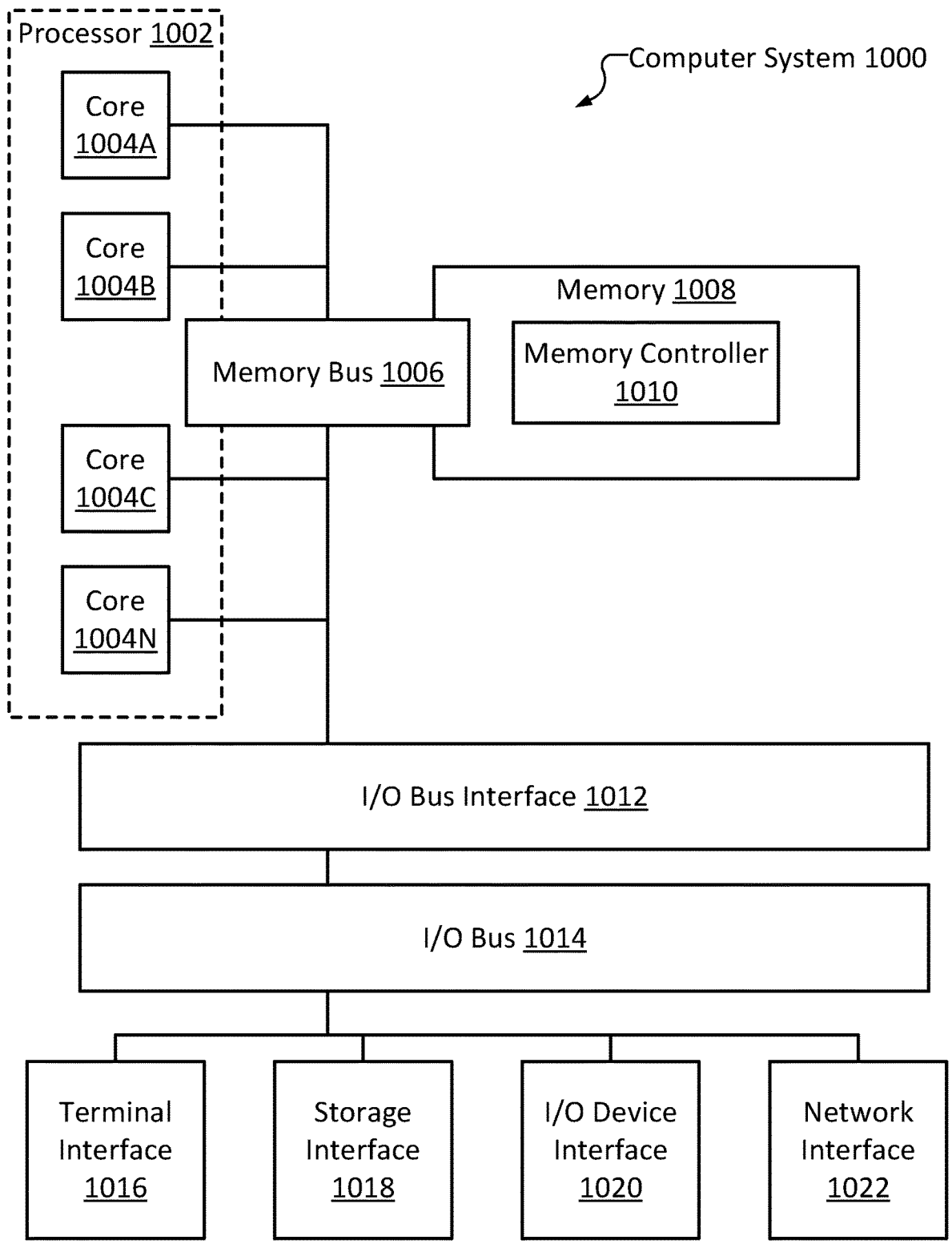
FIG. 10 illustrates a high-level block diagram of an example computer system that may be used in implementing embodiments of the present disclosure.

Referring now to FIG. 10, shown is a high-level block diagram of an example computer system 1000 that may be configured to perform various aspects of the present disclosure, including, for example, processes 800 and 900. The example computer system 1000 may be used in implementing one or more of the methods or modules, and any related functions or operations, described herein (e.g., using a set of processors comprising one or more processor circuits or computer processors of the computer), in accordance with embodiments of the present disclosure. Actions performed by a set of processors may be performed by a single processor, one out of a group of processors, all of a group of processors, or any amount in between. In some embodiments, the major components of the computer system 1000 may comprise one or more CPUs 1002, a memory subsystem 1008, a terminal interface 1016, a storage interface 1018, an I/O (Input/Output) device interface 1020, and a network interface 1022, all of which may be communicatively coupled, directly or indirectly, for inter-component communication via a memory bus 1006, an I/O bus 1014, and an I/O bus interface unit 1012.

The computer system 1000 may contain one or more general-purpose programmable central processing units (CPUs) 1002, some or all of which may include one or more cores 1004A, 1004B, 1004C, and 1004D, herein generically referred to as the CPU 1002. In some embodiments, the computer system 1000 may contain multiple processors typical of a relatively large system; however, in other embodiments the computer system 1000 may alternatively be a single CPU system. Each CPU 1002 may execute instructions stored in the memory subsystem 1008 on a CPU core 1004 and may comprise one or more levels of on-board cache.

In some embodiments, the memory subsystem 1008 may comprise a random-access semiconductor memory, storage device, or storage medium (either volatile or non-volatile) for storing data and programs. In some embodiments, the memory subsystem 1008 may represent the entire virtual memory of the computer system 1000 and may also include the virtual memory of other computer systems coupled to the computer system 1000 or connected via a network. The memory subsystem 1008 may be conceptually a single monolithic entity, but, in some embodiments, the memory subsystem 1008 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 804 may contain elements for control and flow of memory used by the CPU 1002. This may include a memory controller 1010.

Although the memory bus 1006 is shown in FIG. 10 as a single bus structure providing a direct communication path among the CPU 1002, the memory subsystem 1008, and the I/O bus interface 1012, the memory bus 1006 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 1012 and the I/O bus 1014 are shown as single respective units, the computer system 1000 may, in some embodiments, contain multiple I/O bus interface units 1012, multiple I/O buses 1014, or both. Further, while multiple I/O interface units are shown, which separate the I/O bus 1014 from various communications paths running to the various I/O devices, in other embodiments some or all of the I/O devices may be connected directly to one or more system I/O buses.

In some embodiments, the computer system 1000 may be a multi-user mainframe computer system, a single-user system, or a server computer or similar device that has little or no direct user interface but receives requests from other computer systems (clients). Further, in some embodiments, the computer system 1000 may be implemented as a desktop computer, portable computer, laptop or notebook computer, tablet computer, pocket computer, telephone, smart phone, mobile device, or any other appropriate type of electronic device.

It is noted that FIG. 10 is intended to depict the representative major components of an exemplary computer system 1000. In some embodiments, however, individual components may have greater or lesser complexity than as represented in FIG. 10, components other than or in addition to those shown in FIG. 10 may be present, and the number, type, and configuration of such components may vary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
    obtaining, in a first message from a source entity and in a second message from a target entity and by a set of processors at a security proxy, context information of a handshake between the source entity and the target entity;
    transmitting, by the set of processors at the security proxy, the context information from the security proxy to a key manager, the key manager maintaining a first private key of the security proxy;
    transmitting, by the set of processors at the security proxy, historical context information of a historical handshake involving the source entity to the key manager;
    receiving, by the set of processors at the security proxy, a first handshake message from the key manager, the first handshake message generated at least based on the context information and the historical context information and signed with the first private key; and
    transmitting, by the set of processors at the security proxy, the first handshake message to the target entity.

2. The method of claim 1, wherein obtaining the context information comprises:
    receiving, by the set of processors at the security proxy, a second handshake message from the source entity as at least a part of the context information, the second handshake message directed to the target entity and signed with a second private key of the source entity.

3. The method of claim 2, further comprising:
    transmitting, by the set of processors at the security proxy, a handshake key used between the security proxy and the target entity to the key manager, the first handshake message encrypted with the handshake key.

4. The method of claim 1, wherein obtaining the context information comprises:
    receiving, by the set of processors at the security proxy, a first hello message from the target entity as at least a part of the context information, the first hello message directed to the source entity for initiating the handshake.

5. The method of claim 4, wherein the first handshake message is also generated based on the first hello message.

6. The method of claim 5, further comprising:
determining, by the set of processors at the security proxy, a second hello message as a response to the first hello message based on the historical context information; and
transmitting, by the set of processors at the security proxy, the second hello message to the target entity.

7. The method of claim 4, further comprising:
transmitting, by the set of processors at the security proxy, to the key manager a set of parameters for determining a handshake key used between the security proxy and the target entity, the first handshake message encrypted with the handshake key determined based on the set of parameters and the first hello message.

8. A method comprising:
receiving, by a set of processors at a key manager, context information of a handshake between a source entity and a target entity from a security proxy, wherein the context information is a set of two or more messages between the source entity and the target entity;
receiving, by the set of processors at the key manager and from the security proxy, historical context information of a historical handshake involving the source entity;
generating, by the set of processors at the key manager, a first handshake message directed to the target entity at least based on the context information and the historical context information, the first handshake message signed with a first private key of the security proxy maintained by the key manager; and
transmitting, by the set of processors at the key manager, the first handshake message to the security proxy.

9. The method of claim 8, wherein receiving the context information comprises:
receiving, by the set of processors at the key manager, a second handshake message from the security proxy as at least a part of the context information, the second handshake message directed to the target entity and signed with a second private key of the source entity.

10. The method of claim 9, further comprising:
receiving, by the set of processors at the key manager, a handshake key used between the security proxy and the target entity from the security proxy;
wherein generating the first handshake message comprises encrypting, by the set of processors at the key manager, the first handshake message with the handshake key.

11. The method of claim 8, wherein receiving the context information comprises:
receiving, by the set of processors at the key manager, a first hello message from the security proxy as at least a part of the context information, the first hello message directed to the source entity for initiating the handshake.

12. The method of claim 11, wherein the first handshake message is also generated based on the first hello message.

13. The method of claim 11, further comprising:
receiving, by the set of processors at the key manager, from the security proxy a set of parameters for determining a handshake key used between the security proxy and the target entity; and
determining, by the set of processors at the key manager, the handshake key based on the set of parameters and the first hello message;
wherein generating the first handshake message comprises encrypting, by the set of processors at the key manager, the first handshake message with the handshake key.

14. A system comprising:
a processor; and
a memory in communication with the processor, the memory containing program instructions that, when executed by the processor, are configured to cause the processor to:
obtain, in a first message from a source entity and in a second message from a target entity, context information of a handshake between the source entity and the target entity at a security proxy;
transmit the context information from the security proxy to a key manager, the key manager maintaining a first private key of the security proxy;
transmit historical context information of a historical handshake involving the source entity to the key manager;
receive a first handshake message from the key manager, the first handshake message generated at least based on the context information and the historical context information and signed with the first private key; and
transmit the first handshake message to the target entity.

15. The system of claim 14, wherein obtaining the context information comprises receiving a second handshake message from the source entity as at least a part of the context information, the second handshake message directed to the target entity and signed with a second private key of the source entity.

16. The system of claim 15, wherein the processor is further configured to transmit a handshake key used between the security proxy and the target entity to the key manager, the first handshake message encrypted with the handshake key.

17. The system of claim 14, wherein obtaining the context information comprises receiving a first hello message from the target entity as at least a part of the context information, the first hello message directed to the source entity for initiating the handshake.

18. The system of claim 17, wherein the first handshake message is also generated based on the first hello message.

19. The system of claim 18, wherein the processor is further configured to:
determine a second hello message as a response to the first hello message based on the historical context information; and
transmit the second hello message to the target entity.

20. The system of claim 17, wherein the processor is further configured to:
transmit, to the key manager, a set of parameters for determining a handshake key used between the security proxy and the target entity, the first handshake message encrypted with the handshake key determined based on the set of parameters and the first hello message.

* * * * *